(12) United States Patent
Angeloni

(10) Patent No.: US 8,393,841 B1
(45) Date of Patent: Mar. 12, 2013

(54) SELF-CONTAINED TOOL BOLT

(76) Inventor: Joseph Angeloni, Olyphant, PA (US)

( * ) Notice: Subject to any disclaimer, the term of this patent is extended or adjusted under 35 U.S.C. 154(b) by 0 days.

(21) Appl. No.: 13/200,735

(22) Filed: Sep. 29, 2011

(51) Int. Cl.
F16B 23/00 (2006.01)

(52) U.S. Cl. .......................... 411/409; 411/383; 16/429

(58) Field of Classification Search .................. 411/383, 411/384, 392, 409, 435, 400, 401, 403; 16/429
See application file for complete search history.

(56) References Cited

U.S. PATENT DOCUMENTS

| | | | | |
|---|---|---|---|---|
| 1,612,446 | A * | 12/1926 | Larson | 74/547 |
| 1,949,618 | A * | 3/1934 | Mollberg | 29/890.122 |
| 3,153,252 | A * | 10/1964 | Ricciardi | 15/144.4 |
| 4,854,797 | A * | 8/1989 | Gourd | 411/383 |
| 4,856,953 | A * | 8/1989 | Lin | 411/383 |
| 5,569,008 | A * | 10/1996 | Chapkovich | 411/383 |
| 5,947,671 | A * | 9/1999 | Kanaan et al. | 411/435 |
| 6,669,423 | B2 * | 12/2003 | Smith | 411/396 |
| 7,198,306 | B2 * | 4/2007 | Ambs | 292/175 |
| 7,343,841 | B2 * | 3/2008 | Phillips et al. | 83/481 |
| 7,347,403 | B2 * | 3/2008 | Belcourt et al. | 248/231.9 |

* cited by examiner

Primary Examiner — Flemming Saether
(74) Attorney, Agent, or Firm — Stuart M. Goldstein

(57) ABSTRACT

A self-contained tool bolt has a head section comprising a top member and a handle section which is expandable from a stored position to a laterally outward, cantilevered position relative to the top member, to provide enhanced tightening and loosening capability of the tool bolt. The tool bolt also comprises a rigid shaft extending from the top member and a bolt section, with external threads, slideably mounted and moveable along the shaft. When the bolt section is at its lowest point on the shaft, the handle section is elevated to provide clearance from obstructions during tightening and loosening of the tool bolt.

23 Claims, 7 Drawing Sheets

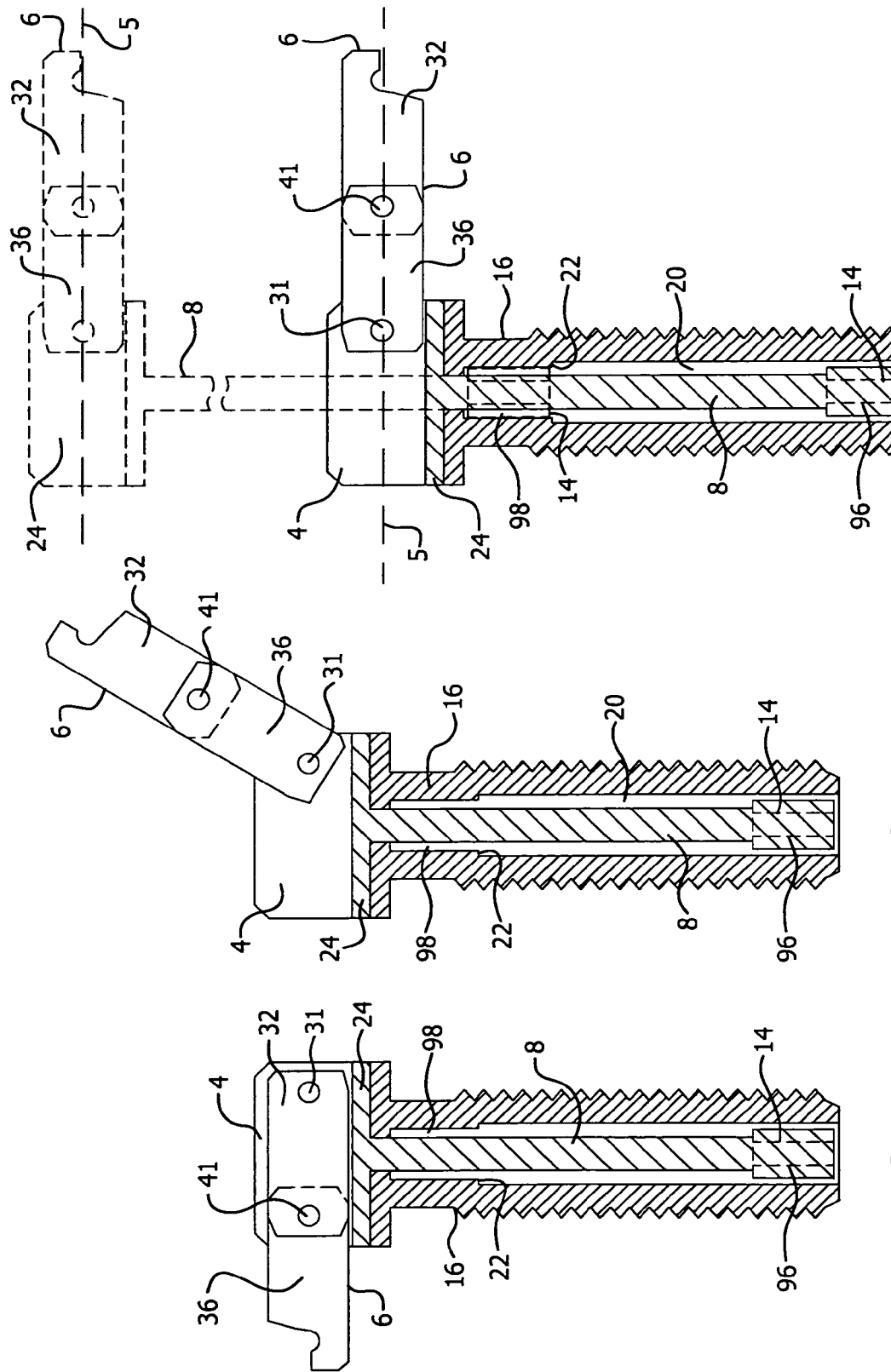

SELF-CONTAINED TOOL BOLT

BACKGROUND OF THE INVENTION

Screws, bolts and other threaded fasteners are routinely tightened or loosened with a screwdriver, pliers, wrench or similar hand tool. There are, however, threaded fasteners, such as wing nuts, having integral components which allow the user to grasp the fastener with his fingers to tighten or loosen it without tools. These fasteners have their place in many applications, but they also have distinct disadvantages. For instance, the extent of tightening and the ability to loosen a snugly secured wing nut or like connecting devices is limited, since such fasteners do not have a means to provide the extra leverage and torque which may be needed to secure or loosen the fastener. In addition, the finger grasping components of these type fasteners extend up from their threaded sections, thus providing cumbersome and often dangerous projections from the fastener itself. Certain hand operated fasteners do include clips or rings secured to the fasteners' heads, which rotate about the heads and, when not in use, rest on top of the head. However, these also have limited tightening/loosening capabilities. Also, such fasteners cannot be used in certain of applications, e.g. for clamp connections.

The threaded sections of screws, bolts and like fasteners are all integral and or securely attached to their respective head sections. This most commonly used fastener configuration also reduces the tightening/loosening capabilities of threaded fasteners, again, since the leverage forces are limited by such rigid construction.

SUMMARY OF THE INVENTION

It is thus an object of the present invention to provide a self-contained tool bolt which overcomes the limitations and disadvantages of existing bolts, screws and similar threaded fasteners.

It is an object of the present invention to provide a self-contained tool bolt having an expandable handle section which, when outwardly and laterally extended, allows for additional leverage and torque for tightening and loosening capabilities of the tool bolt.

It is another object of the present invention to provide a self-contained tool bolt which has a head section configured to house an expandable handle section, neatly and compactly into the head section.

It is a further object of the present invention to provide a self-contained tool bolt which has a bolt section which is slideably mounted on a shaft, to elevate the handle section of the tool bolt to provide clearance from obstructions during tightening and loosening of the tool bolt.

These and other objects are accomplished by the present invention, a self-contained tool bolt having a head section comprising a top member and a handle section which is expandable from a stored position to a laterally outward, cantilevered position relative to the top member, to provide enhanced tightening and loosening capability of the tool bolt. The tool bolt also comprises a rigid shaft extending from the top member and a bolt section, with external threads, slideably mounted and moveable along the shaft. When the bolt section is at its lowest point on the shaft, the handle section is elevated to provide clearance from obstructions during tightening and loosening of the tool bolt.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

BRIEF DESCRIPTION OF THE DRAWINGS

FIGS. 5-9 show, in cross-section, the sequence of unfolding of the handle section of the self-contained tool bolt of the present invention.

DETAILED DESCRIPTION OF THE INVENTION

Figure 1:
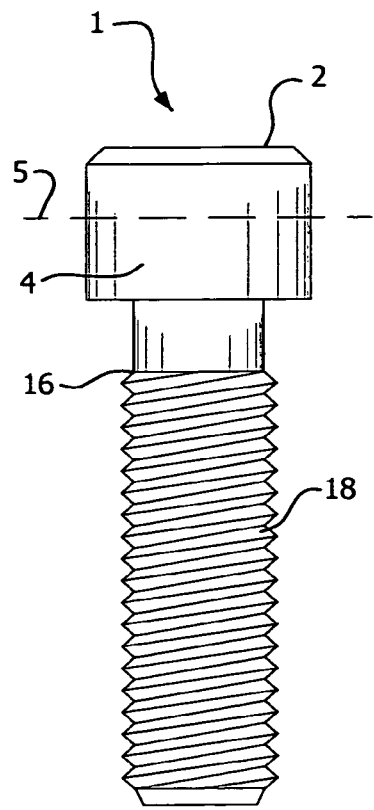
FIG. 1 is an elevation view of the self-contained tool bolt of the present invention with its shaft fully retracted within the bolt section.
Figure 2:
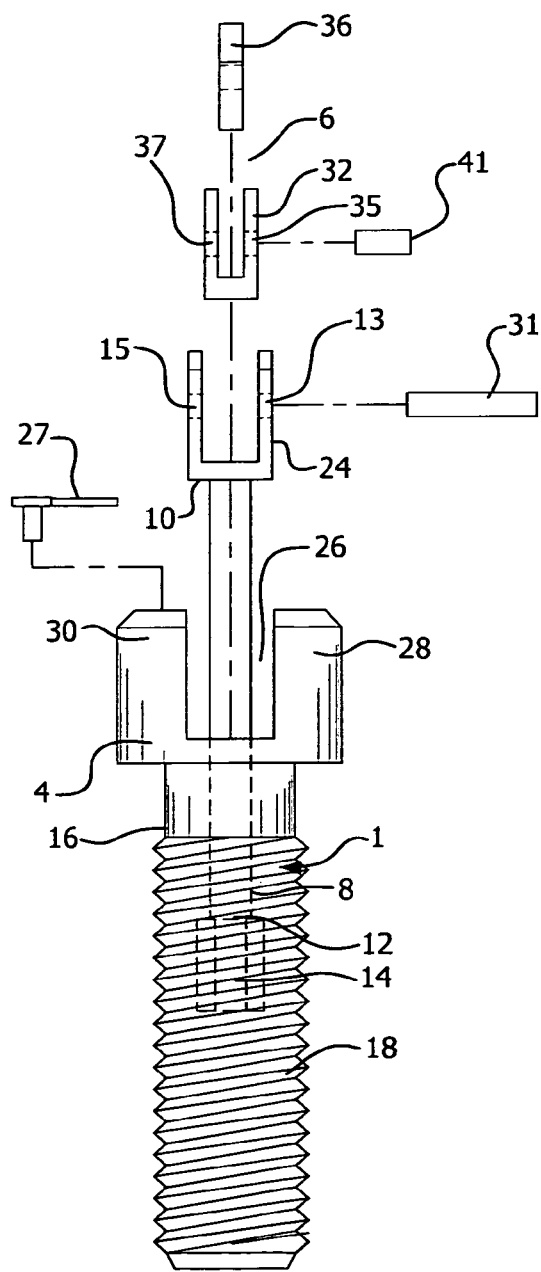
FIG. 2 is an exploded different elevation view of the self-contained tool bolt of the present invention.
Figure 6:
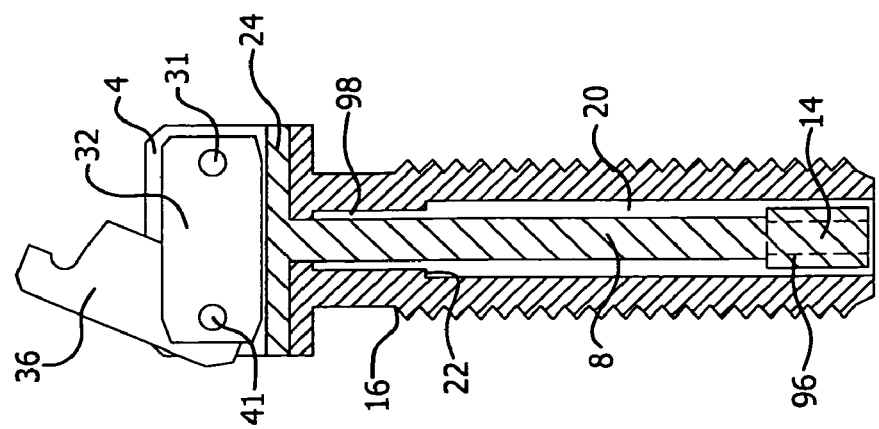
Figure 5:
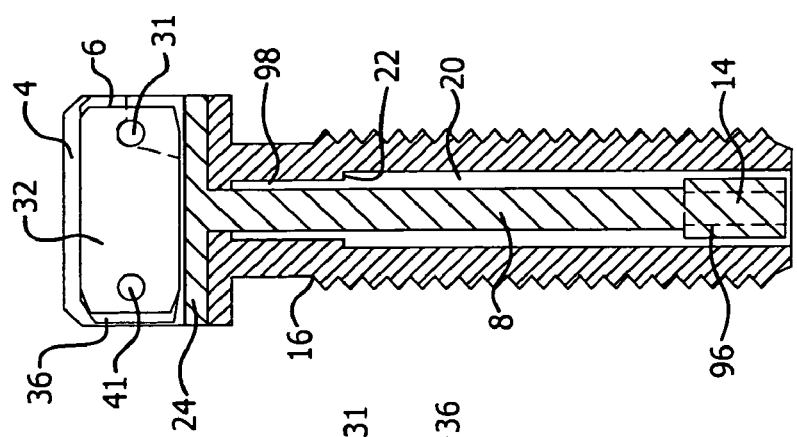

As seen in FIGS. 1-9, tool bolt 1 comprises head section 2 having top member 4, with longitudinal axis 5, secured to bolt section 16. Handle section 6 is housed within top member 4. Bolt section 16, having external male threads 18, comprises internal channel 20 which extends entirely through the center of the bolt section. Internal lip 22 extends from channel 20 near the top of bolt section 16. Shaft 8 is slideably positioned within channel 20. Handle cradle 24 is connected to one end 10 of shaft 8 and stop element 14 is secured at the other end 12 of the shaft. Shaft 8 is slideable within channel 20 from a lowered position within bolt section 16, e.g. as shown in FIGS. 1, 3, 5-8, to a fully raised position, extending out of the bolt section, e.g. as shown in FIGS. 2 and 9. In this position stop element 14 contacts lip 22 within channel 20, to prevent shaft 8 from exiting bolt section 16.

Figure 3:
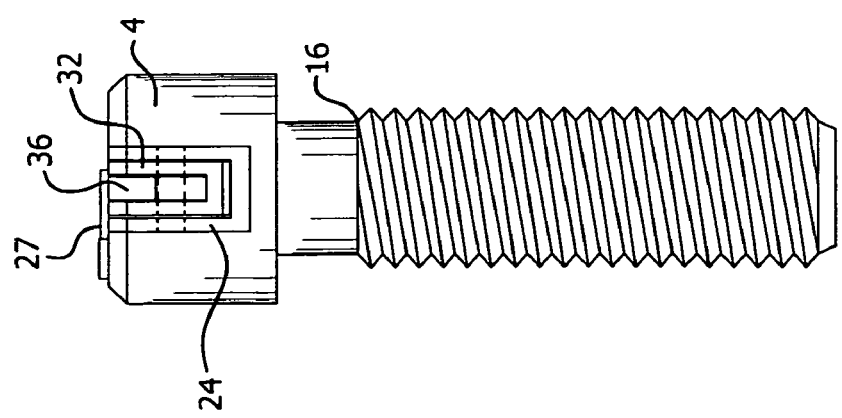
FIG. 3 is the elevation view of FIG. 2, showing components assembled in the head section of the self-contained tool bolt of the present invention and with its shaft fully retracted within the bolt section.

As best seen in FIGS. 2 and 3, top member 4 of head section 2 comprises slotted interior open space 26, bordered by top member side walls 28 and 30. Handle section 6 comprises first handle segment 32 and second handle segment 36. Support cradle 24 is configured to rest within open space 26 when shaft 8 is fully retracted within bolt section 16. First handle segment 32 is configured to rest within support cradle 24 when handle section 6 is folded within top member 4. First handle segment 32 is rotatably secured to support cradle by pin 31, extending through slots 13 and 15 in the support cradle. Second handle segment 36 is rotatably secured to first handle segment 32 by pin 41, extending through slots 35 and 37 is the first handle segment.

When first handle segment 32 and second handle segment 36 are fully expanded and extended out, as seen in FIG. 9, the segments are located within longitudinal axis 5 of top member 4, and handle section 6 is positioned for use, advantageously providing a handle with increased torque for turning bolt tool 1.

Figure 4:
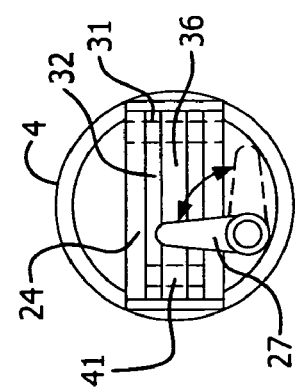
FIG. 4 is a top view of the self-contained tool bolt of the present invention.

FIGS. 3 and 4 show support cradle 24, first handle segment 32 and second handle segment 36 adjacent to each other, folded within open space 26, and thereby stored within top member 4. Locking arm 27 is rotatably connected to top member 4. When the support cradle and folded handle segments are positioned within open space 26, locking arm 27 is rotated over the sections to secure them within top member 4.

In use, bolt section 16 of tool bolt 1 is joined to a threaded female connection by initially engaging the first few threads 18 of the bolt section. Tool bolt 1 is then screwed into the connection, first by turning head section 2. Locking arm 27 is then rotated off support cradle 24 and folded handle segments 32 and 36. As seen in FIGS. 6-9, first handle segment 32 and second handle segment 36 are then rotatably unfolded from within support cradle 24 in top member 4 to a fully laterally extended, outward, cantilevered position within longitudinal axis 5 of top member 4. This fully extended handle section 6, positioned above bolt section 16, increases the overall length of head section 2, providing tool bolt 1 with additional leverage and torque to increase its connection capability with the corresponding female connection.

When operating clearance between head section 2 and bolt section 16 is needed to avoid intervening obstructions, support cradle 24 is lifted up, thereby pulling shaft 8 up and away from the bolt section. Upward movement of shaft 8 out of bolt section 16 is limited and halted, when stop element 14 of the shaft contacts lip 22 of channel 20 of the bolt section. At this point, shaft 8 is withdrawn from bolt section 16 to the full extent possible. Support cradle 24, with handle section 6, is now well above the bolt section, as shown in dashed lines in FIG. 9. In this position, elevated handle section 6 can be readily manually rotated above any obstruction. This is accomplished by means of a hex drive located with bolt section 16. Stop element 14 is configured as a male hex drive member, with ridges 96, adapted to engage with the corresponding slotted female hex drive portion 98 of bolt section 16. Ridges 96 located within slotted portion 98, provides a connection between shaft 8 and bolt section 16, allowing the bolt section to rotate as handle section 6 is manually rotated.

Figure 10:
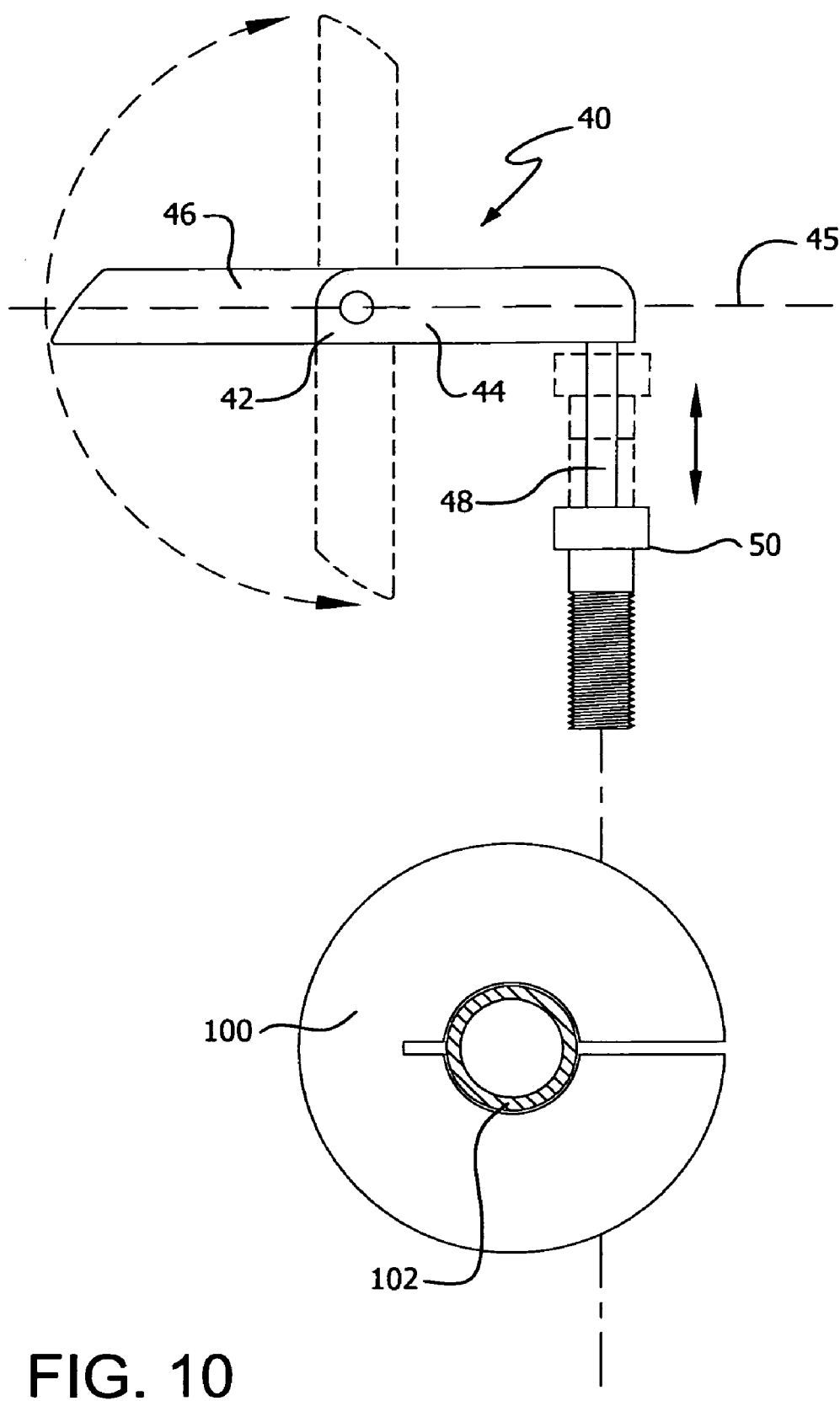
FIG. 10 is an elevation view of an alternate embodiment of the self-contained tool bolt of the present invention to be used with a clamp.
Figure 11:
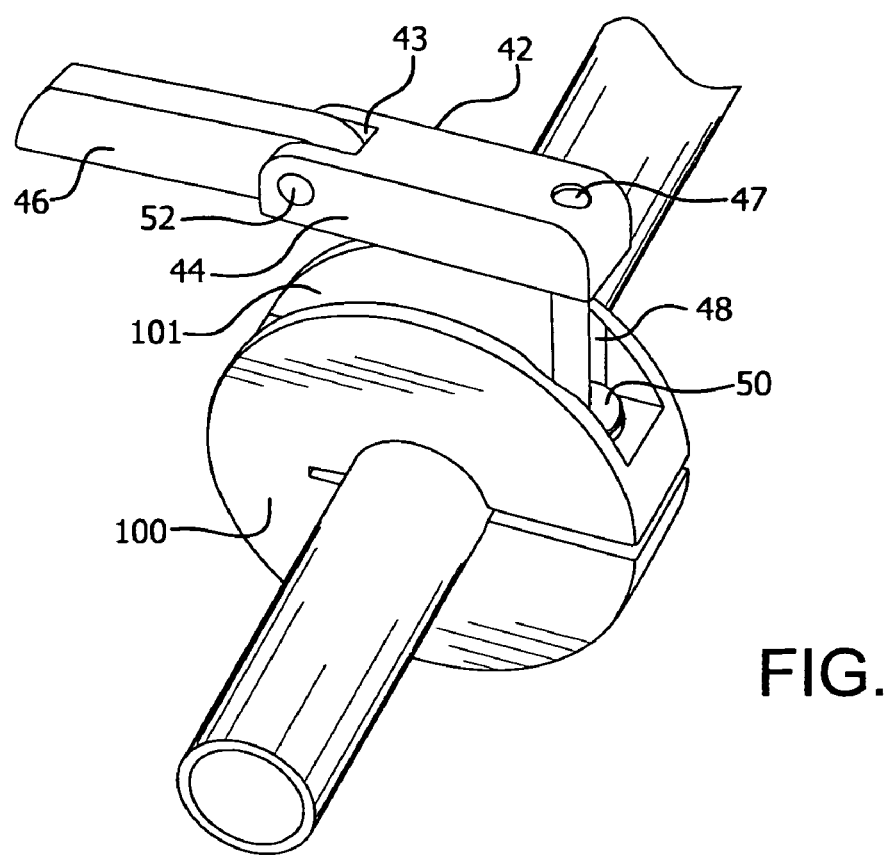
FIG. 11 is a perspective view of the embodiment shown in FIG. 10 in the process of securing a clamp to a pipe.
Figure 12:
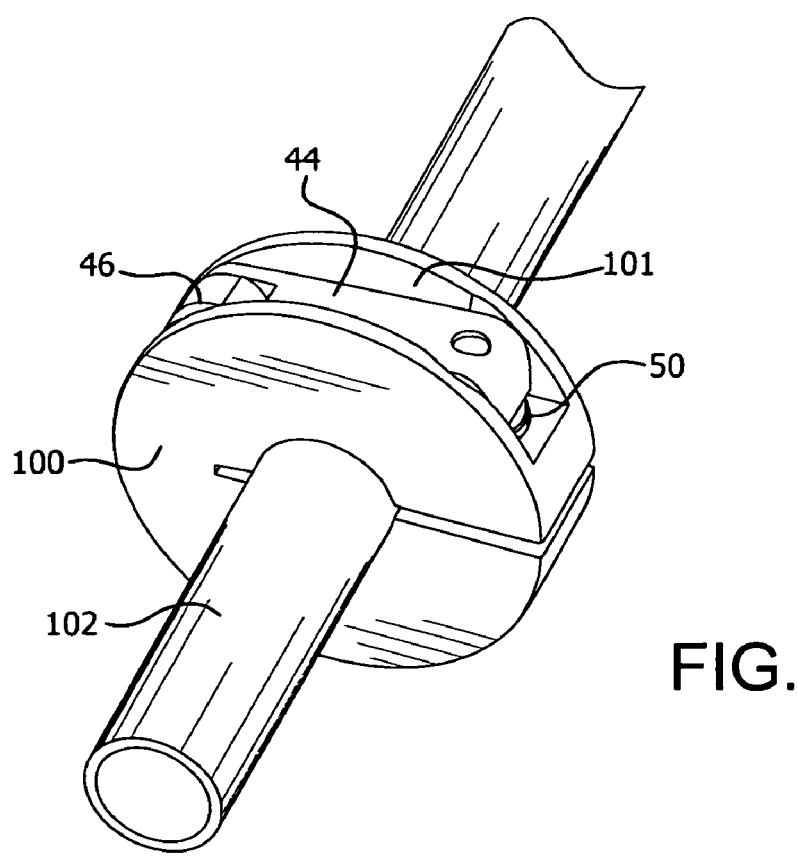
FIG. 12 is a perspective view of the embodiment shown in FIG. 10 enclosed within a secured clamp.

FIGS. 10-12 show an alternate embodiment of the invention. Tool bolt 40 comprises head section 42 having top member 44 with longitudinal axis 45, and handle section 46. Shaft 48 is rigidly and immovably secured through top member 44 at 47. Bolt section 50 is slideably mounted on shaft 48, its downward movement on the shaft limited and rotational connection controlled as has been previously described.

Top member 44 of head section 42 comprises open space 43 into which the end of handle section 46 is rotatably connected by pin 52, extending through opening 43. Handle section 46 is rotatable about pin 52 and, when extended outward and within longitudinal axis 45 of top member 44, the handle extends to a cantilevered position, increasing the length of head section 42 and again providing additional torque to increase the connection capability of tool bolt 40.

FIGS. 10-12 additionally show tool bolt 40 utilized to tighten clamp 100 around pipe 102. Bolt section 50 is threaded into the female threaded connection (not shown) of clamp 100. Head section 42 is then slid up along shaft 48, to a position over bolt section 50, thus also raising the head section over clamp 100, as best seen in FIG. 11. Handle section 46 can then be turned to fully tighten clamp 100 around pipe 102. Once tightening is complete, head section 42 is slid back down shaft 48, such that both top member 44 and handle section 46 are nested within slot 101 of clamp 100, as seen in FIG. 12.

FIGS. 13-17 show a further embodiment of the invention. Tool bolt 60 comprises head section 62 having top member 64, with longitudinal axis 65 and open space 67. Head section 62 comprises external sleeve member 66, which is rotatable about top member 64. Sleeve member 66 has top surface 68, lateral opening 70, larger lateral opening 72 and top slot 74 traversing a limited distance through the top surface. Stop member 76 is fixedly mounted to top member 64 and extends through slot 74 of sleeve member 66. The positioning of stop member 76 within slot 74 serves to limit the rotational movement of sleeve member 66 around top member 64.

Handle section 80 comprises telescoping handle segments 82, 83, and 84. These handle segments are mounted in a retracted position within open space 67 of top member 64. Handle segment 82 has a smaller diameter than handle segment 83, which has a smaller diameter than handle segment 84. Handle segment 82 has a larger diameter than the diameter of lateral opening 70. Lateral opening 72 has a larger diameter than handle segment 84.

Spring retainer 86 is secured within open space 67 of top member 64. Bias spring 88 circumscribes stem 87 of retainer 86, when handle section 80 is in the retracted position shown in FIG. 13. In this retracted position, the three handle segments, 82, 83, and 84, are nested together within open space 67 of top member 64. When handle section 80 is in the expanded position, shown in FIG. 14, spring 88 extends through top member 64 and all the expanded handle segments. Indent 69 on top member 64 acts as a stop to limit the biased movement of handle segment 84 within the top member. In like manner, indent 71 on handle segment 84 ensures that the biased movement of handle segment 83 within handle segment 84 is limited, and indent 73 on handle segment 82 ensures that the movement of handle segment 82 within handle segment 83 is limited.

Figure 13:
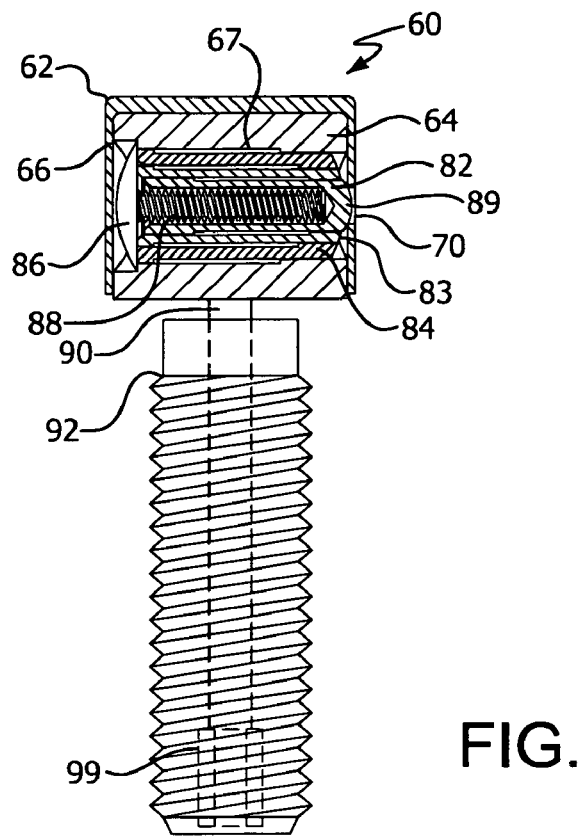
FIG. 13 is a partial cross-sectional view of another embodiment of the self-contained tool bolt of the present invention with its shaft fully retracted within the bolt section.
Figure 14:
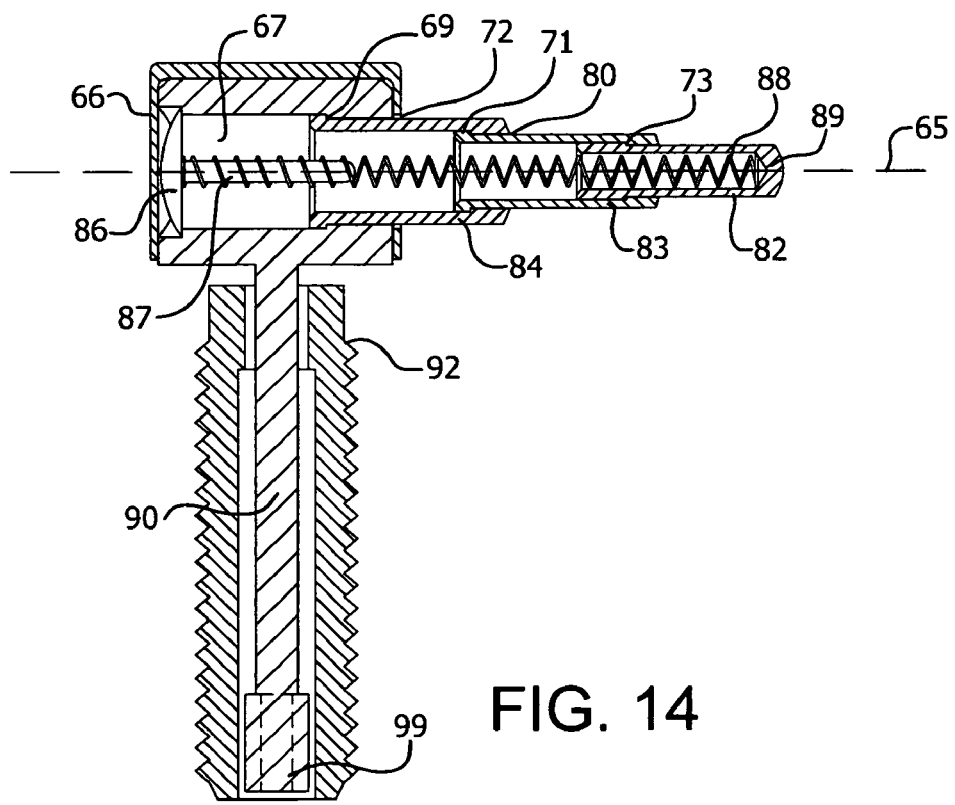
FIG. 14 is a cross-sectional view of the embodiment shown in FIG. 13 with its handle section fully expanded.
Figure 15:
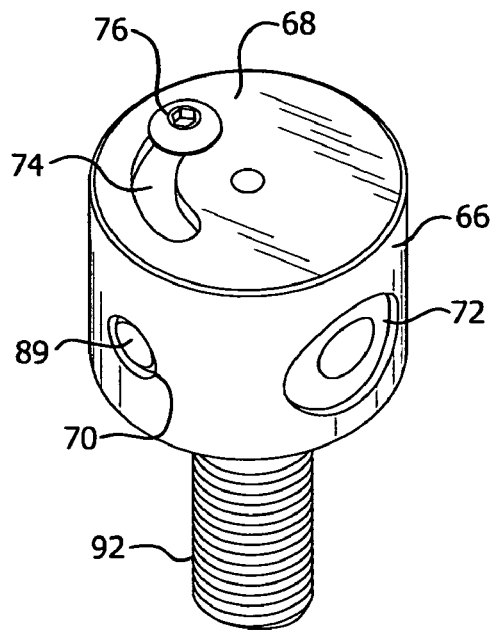
FIGS. 15-17 are perspective views of the embodiment shown in FIG. 13, showing the sequence of operation of the embodiment.
Figure 16:
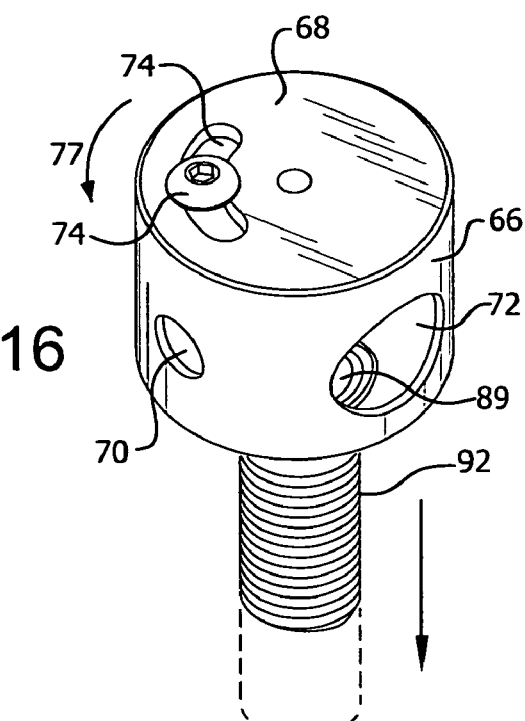

In the tool bolt's retracted position, shown in FIGS. 13 and 15, end 89 of handle segment 82 is biased by spring 88, so that it is pushed into and located within lateral opening 70. In this mode, stop member 76 is positioned at one end of slot 74. Upon rotation of sleeve member 66 in counter-clockwise direction 77, shown in FIG. 16, larger lateral opening 72 is ultimately moved to a position directly over end 89 of handle segment 82. When lateral opening 72 is directly over end 89 and handle segment 82, spring 88 is permitted to expand, causing handle segments 82, 83 and 84, all having smaller diameters than lateral opening 72, to extend through the lateral opening. In this the expanded position, shown in FIGS. 14 and 17, handle section 80 extends outward, in a cantilevered position in relation to and within longitudinal axis 65 of top member 64.

During the rotation of sleeve member 66, slot 74 also rotates counter-clockwise until the second end of the slot comes into contact with stop member 76, fixedly mounted to top member 66. See FIG. 17. This stops the rotational movement of the sleeve member 66 around top member 64. Sleeve member 66 is designed such that, upon its rotational movement, lateral opening 72 will be directly over retracted handle segments 82, 83, and 84 substantially at the same time the second end of slot 74 comes into contact with stop member 76.

To retract handle section 80, the user simply pushes handle segments 82, 83, and 84 into top member 64 and rotates sleeve member 66 clockwise, until end 89 of segment 82 is returned to its position within lateral opening 70 and stop member 76 is again located at the first end of slot 74. Sleeve member 66 is designed such that, upon its rotational movement, lateral opening 70 will be directly over retracted handle segments 82, 83, and 84 substantially at the same time the first end of slot 74 comes into contact with stop member 76.

As with the first embodiment, shaft 90, comprising protruding stop element 99, is slideably within bolt section 92, and its downward movement of the shaft limited and rotational connection controlled as has been previously described.

Figure 17:
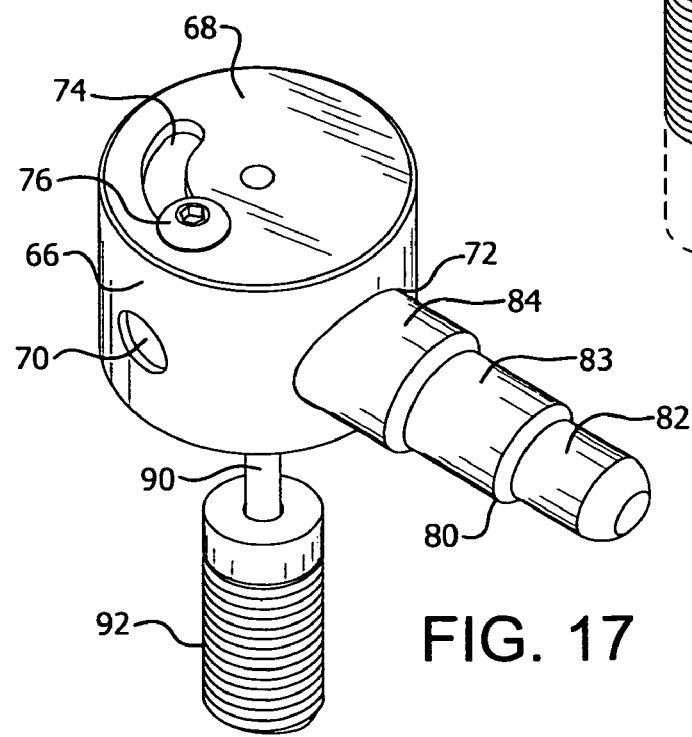

Thus, in the expanded position shown in FIGS. 14 and 17, in which handle section 80 extends from top member 64, and especially when shaft 90 is slid up through bolt section 92, tool bolt 60 not only is provided with additional leverage and torque to increase its connecting capability, but also has an elevated handle which overcomes intervening obstacles.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A self-contained tool bolt comprising:
a head section comprising a top member having an open space and a longitudinal axis, a handle section having one end at all times located and connected at that one end within the open space of the top member, said handle section having at least first and second handle segments expandable from a first position in which the handle segments are located within the open space to a second laterally extended cantilevered position wherein the handle segments extend outward from the open space, and means located within the top member for permitting the handle segments to be expandable to the outward, laterally extended, cantilevered position, whereby the handle section is adjustable to said outward, laterally extended, cantilevered position such that it is aligned with the longitudinal axis of the top member, and whereby the length of the head section is thereby increased to provide additional rotational leverage to the tool bolt;
a shaft located perpendicular to the top member;
a bolt section having external threads which extend substantially the full length of the bolt section, said bolt section having an internal channel extending through the bolt section, the shaft being located within the channel in the bolt section, such that the shaft is slideably movable within the bolt section from a position wherein the shaft is enclosed within the bolt section to a position in which substantially the full length of the shaft is raised up from and extends out of the bolt section; and
wherein the shaft comprises two ends including a second end distal from the head section having a stop element for limiting and halting the movement of the shaft within the bolt section.

2. The self-contained tool bolt as in claim 1 wherein the first handle segment is attached to the top member and wherein the means within the top member comprises a connection for rotating that handle segment to the cantilevered position aligned with the longitudinal axis.

3. The self-contained tool bolt as in claim 1 further comprising a second connection for rotatably attaching the first handle segment to the second handle segment.

4. The self-contained tool bolt as in claim 1 wherein the open space in the top member comprises a slotted opening, whereby the first and second handle segments are rotatably foldable within the slotted opening and whereby when said segments are removed from the slotted opening they are rotatably adjustable outward to said cantilevered position within the longitudinal axis of the top member.

5. The self-contained tool bolt as in claim 1 wherein the first and second handle segments are rotatably foldable such that in the folded position they fit completely within the slotted opening.

6. The self-contained tool bolt as in claim 1 wherein the handle section comprises at least first and second telescoping handle segments adjustable between said two positions, the two positions being telescoping positions whereby in the first telescoping position, the handle segments are retracted and fully housed within the open space of the top member and in the second telescoping position, the handle segments are laterally extended outward in the cantilevered position within the longitudinal axis of the top member.

7. The self-contained tool bolt as in claim 6 further comprising a sleeve member positioned on and rotatable around the top member.

8. The self-contained tool bolt as in claim 7 wherein the sleeve member comprises two lateral openings, one opening through which the handle segments extend when the handle segments are in said cantilevered position, and the second opening for receiving one of the end of one of the segments when the handle segments are in said cantilevered position.

9. The self-contained tool bolt as in claim 6 further comprising biasing element for maintaining the handle segments in the cantilevered position.

10. A self-contained tool bolt comprising:
a head section comprising a top member and a handle section extending connected to the top member, said handle section connected to the top member such that it is laterally extendable from the top member;
a shaft located perpendicular to the top member;
a bolt section having external threads which extend substantially the full length of the bolt section, said bolt section having an internal channel extending entirely therethrough, the shaft being located within the internal channel, such that the shaft is slideably movable within the bolt section from a position wherein the shaft is enclosed within the bolt section to a position in which substantially the full length of the shaft is raised up from and extends out of the bolt section; and
wherein the shaft comprises two ends including a second end distal from the head section having a stop element for limiting and halting the movement of the shaft within the bolt section.

11. The self-contained tool bolt as in claim 10 wherein the shaft comprises one end being configured to move through the top member.

12. The self-contained tool bolt as in claim 11 wherein the bolt section comprises an internal lip for contacting the stop element.

13. The self-contained tool bolt as in claim 11 further comprising rotational connection between the stop means and bolt section to permit rotation of the tool bolt upon rotation of the handle section.

14. The self-contained tool bolt as in claim 13 wherein the rotational limit connection comprises a hex drive.

15. The self-contained tool bolt as in claim 10 wherein the top member has an open space, the handle section having one end at all times located within the open space of the top member, and means within the top member for permitting the handle section to be expandable to an outward, laterally extended, cantilevered position in relation to the top member.

16. The self-contained tool bolt as in claim 15 wherein the handle section comprises a handle segment attached to the top member and wherein the means within the top member comprises a connection for rotating the handle segment to the cantilevered position.

17. The self-contained tool bolt as in claim 16 further comprising a second handle segment and a second connection means for rotatably attaching the first handle segment to the second handle segment.

18. The self-contained tool bolt as in claim 17 wherein the open space in the top member comprises a slotted opening, whereby the first and second handle segments are rotatably foldable within the slotted opening and whereby when said segments are removed from the slotted opening they are rotatably adjustable outward to said cantilevered position.

19. The self-contained tool bolt as in claim 18 wherein the first and second handle segments are rotatably foldable such that in the folded position they fit completely within the slotted opening.

20. The self-contained tool bolt as in claim 15 wherein the handle section comprises a plurality of telescoping handle segments adjustable between two positions, whereby in the first position, the handle segments are retracted and fully housed within the opening in the top member and in the second position, the handle segments are laterally extended outward in the cantilevered position.

21. The self-contained tool bolt as in claim 20 further comprising a sleeve member positioned on and rotatable around the top member.

22. The self-contained tool bolt as in claim 21 wherein the sleeve member comprises two lateral openings, one opening through which the handle segments extend when the handle segments are in said cantilevered position, and the second opening for receiving one of the end of one of the segments when the handle segments are in said retracted position.

23. A self-contained tool bolt comprising:
a head section comprising a top member having an open space and a longitudinal axis, a handle section having one end at all times located within the open space of the top member, said handle section comprising a plurality of telescoping handle segments adjustable between two positions, whereby in the first position, the handle segments are retracted and fully housed within the open space of the top member and in the second position the handle segments are laterally extended outward in the cantilevered position within the longitudinal axis of the top member, the handle section is expandable to an outward, laterally extended, cantilevered position in relation to the top member, whereby the handle section is adjustable to said outward, laterally extended, cantilevered position such that it is aligned with the longitudinal axis of the top member, and whereby the length of the head section is thereby increased to provide additional rotational leverage to the tool bolt;
a shaft located perpendicular to the top member;
a bolt section with external threads, said bolt section having an internal channel extending through the bolt section, the shaft being located within the channel in the bolt section, such that the shaft is slideably movable within the bolt section; and
a sleeve member positioned on and rotatable around the top member, the sleeve member comprising two lateral openings, one opening through which the handle segments extend when the handle segments are in said cantilevered position, and the second opening for receiving one of the end of one of the segments when the handle segments are in said cantilevered position.

\* \* \* \* \*